United States Patent
Rathod et al.

(10) Patent No.: US 8,209,724 B2
(45) Date of Patent: *Jun. 26, 2012

(54) METHOD AND SYSTEM FOR PROVIDING ACCESS TO INFORMATION OF POTENTIAL INTEREST TO A USER

(75) Inventors: Priyang Rathod, Mountain View, CA (US); Mithun Sheshagiri, Berkeley, CA (US); Phuong Nguyen, San Jose, CA (US); Anugeetha Kunjithapatham, Sunnyvale, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1262 days.

This patent is subject to a terminal disclaimer.

(21) Appl. No.: 11/789,609

(22) Filed: Apr. 25, 2007

(65) Prior Publication Data
US 2008/0266449 A1 Oct. 30, 2008

(51) Int. Cl.
*G06F 13/00* (2006.01)
(52) U.S. Cl. ........... 725/53; 725/46; 725/51; 725/40; 725/45; 348/465; 348/467; 348/468; 348/714; 348/715; 348/716; 348/563; 348/564
(58) Field of Classification Search ............ 725/53, 725/46, 51, 40, 45; 348/465, 467–468, 714, 348/715, 716, 563, 564
See application file for complete search history.

(56) References Cited

U.S. PATENT DOCUMENTS

| | | | |
|---|---|---|---|
| 5,703,655 A | 12/1997 | Corey et al. |
| 5,790,935 A | 8/1998 | Payton |
| 5,974,406 A | 10/1999 | Bisdikian et al. |
| 5,983,214 A | 11/1999 | Lang et al. |
| 5,983,237 A | 11/1999 | Jain et al. |
| 5,995,959 A | 11/1999 | Friedman et al. |
| 6,151,603 A | 11/2000 | Wolfe |
| 6,253,238 B1 | 6/2001 | Lauder et al. |
| 6,334,127 B1 | 12/2001 | Bieganski et al. |
| 6,412,073 B1 | 6/2002 | Rangan |
| 6,438,579 B1 | 8/2002 | Hosken |
| 6,480,844 B1 | 11/2002 | Cortes et al. |
| 6,637,028 B1 | 10/2003 | Voyticky et al. |

(Continued)

FOREIGN PATENT DOCUMENTS

CN 1393107 A 1/2003
(Continued)

OTHER PUBLICATIONS

U.S. Non-final Office Action for U.S. Appl. No. 11/981,019 mailed on Oct. 6, 2010, United States.

(Continued)

*Primary Examiner* — Jun Fei Zhong
(74) *Attorney, Agent, or Firm* — Beyer Law Group LLP

(57) ABSTRACT

The present invention provides a method and system for providing access to information of potential interest to a user. Closed-caption information is analyzed to find related information on the Internet. User interactions with a TV which receives programming including closed-caption information are monitored to determine user interests. The related closed-caption information is analyzed to determine key information therein. The key information is used for searching for information in available resources such as the Internet, and the search results are used to make recommendations to the user about information of potential interest to the user.

38 Claims, 5 Drawing Sheets

U.S. PATENT DOCUMENTS

| | | |
|---|---|---|
| 6,721,748 B1 | 4/2004 | Knight et al. |
| 6,766,523 B2 | 7/2004 | Herley |
| 6,774,926 B1 | 8/2004 | Ellis et al. |
| 6,807,675 B1 | 10/2004 | Maillard |
| 6,826,512 B2 | 11/2004 | Dara-Abrams et al. |
| 6,842,877 B2 | 1/2005 | Robarts et al. |
| 6,954,755 B2 | 10/2005 | Reisman |
| 6,981,040 B1 | 12/2005 | Konig et al. |
| 7,028,024 B1 | 4/2006 | Kommers et al. |
| 7,054,875 B2 | 5/2006 | Keith, Jr. |
| 7,062,561 B1 | 6/2006 | Reisman |
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oliver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 | 6/2008 | Maybury et al. |
| 7,389,224 B1 | 6/2008 | Elworthy |
| 7,389,307 B2 | 6/2008 | Golding |
| 7,433,935 B1 | 10/2008 | Obert |
| 7,552,114 B2 | 6/2009 | Zhang et al. |
| 7,565,345 B2 | 7/2009 | Bailey et al. |
| 7,593,921 B2 | 9/2009 | Goronzy et al. |
| 7,603,349 B1 | 10/2009 | Kraft et al. |
| 7,617,176 B2 | 11/2009 | Zeng et al. |
| 7,634,461 B2 | 12/2009 | Oral et al. |
| 7,657,518 B2 | 2/2010 | Budzik et al. |
| 7,685,192 B1 | 3/2010 | Scofield et al. |
| 7,716,158 B2 | 5/2010 | McConnell |
| 7,716,199 B2 | 5/2010 | Guha |
| 7,793,326 B2 | 9/2010 | McCoskey et al. |
| 8,060,905 B1 | 11/2011 | Hendricks |
| 8,065,697 B2 | 11/2011 | Wright et al. |
| 8,115,869 B2 * | 2/2012 | Rathod et al. ............... 348/465 |
| 2001/0003214 A1 * | 6/2001 | Shastri et al. ............... 725/109 |
| 2001/0023433 A1 | 9/2001 | Natsubori et al. |
| 2002/0022491 A1 | 2/2002 | McCann et al. |
| 2002/0026436 A1 | 2/2002 | Joory |
| 2002/0087535 A1 | 7/2002 | Kotcheff et al. |
| 2002/0161767 A1 | 10/2002 | Shapiro et al. |
| 2002/0162121 A1 | 10/2002 | Mitchell |
| 2003/0028889 A1 | 2/2003 | McCoskey |
| 2003/0033273 A1 | 2/2003 | Wyse |
| 2003/0105682 A1 | 6/2003 | Dicker et al. |
| 2003/0131013 A1 | 7/2003 | Pope et al. |
| 2003/0158855 A1 | 8/2003 | Farnham et al. |
| 2003/0172075 A1 | 9/2003 | Reisman |
| 2003/0184582 A1 | 10/2003 | Cohen |
| 2003/0221198 A1 * | 11/2003 | Sloo ............... 725/136 |
| 2003/0229900 A1 | 12/2003 | Reisman |
| 2003/0231868 A1 | 12/2003 | Herley |
| 2004/0031058 A1 | 2/2004 | Reisman |
| 2004/0073944 A1 | 4/2004 | Robert |
| 2004/0194141 A1 * | 9/2004 | Sanders ............... 725/53 |
| 2004/0244038 A1 | 12/2004 | Utsuki et al. |
| 2004/0249790 A1 | 12/2004 | Komamura |
| 2005/0004910 A1 | 1/2005 | Trepess |
| 2005/0137996 A1 | 6/2005 | Billsus et al. |
| 2005/0144158 A1 | 6/2005 | Capper et al. |
| 2005/0154711 A1 | 7/2005 | McConnell |
| 2005/0160460 A1 | 7/2005 | Fujiwara et al. |
| 2005/0177555 A1 | 8/2005 | Alpert et al. |
| 2005/0240580 A1 | 10/2005 | Zamir et al. |
| 2005/0246726 A1 | 11/2005 | Labrou et al. |
| 2005/0289599 A1 | 12/2005 | Matsura et al. |
| 2006/0026152 A1 | 2/2006 | Zeng et al. |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 | 4/2006 | Ng |
| 2006/0095415 A1 | 5/2006 | Sattler et al. |
| 2006/0133391 A1 | 6/2006 | Kang et al. |
| 2006/0136670 A1 | 6/2006 | Brown et al. |
| 2006/0156326 A1 | 7/2006 | Goronzy et al. |
| 2006/0161542 A1 | 7/2006 | Cucerzan et al. |
| 2006/0195362 A1 | 8/2006 | Jacobi et al. |
| 2006/0242283 A1 | 10/2006 | Shaik et al. |
| 2007/0043703 A1 | 2/2007 | Bhattacharya et al. |
| 2007/0050346 A1 | 3/2007 | Goel et al. |
| 2007/0061222 A1 | 3/2007 | Allocca et al. |
| 2007/0061352 A1 | 3/2007 | Dimitrova et al. |
| 2007/0073894 A1 | 3/2007 | Erickson et al. |
| 2007/0078822 A1 | 4/2007 | Cucerzan et al. |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 | 7/2007 | Kim et al. |
| 2007/0179776 A1 | 8/2007 | Segond et al. |
| 2007/0198485 A1 | 8/2007 | Ramer et al. |
| 2007/0198500 A1 | 8/2007 | Lucovsky et al. |
| 2007/0214123 A1 | 9/2007 | Messer et al. |
| 2007/0214488 A1 * | 9/2007 | Nguyen et al. ............... 725/134 |
| 2007/0220037 A1 | 9/2007 | Srivastava et al. |
| 2007/0233287 A1 | 10/2007 | Sheshagiri et al. |
| 2007/0300078 A1 | 12/2007 | Ochi et al. |
| 2008/0040316 A1 | 2/2008 | Lawrence |
| 2008/0082744 A1 | 4/2008 | Nakagawa |
| 2008/0114751 A1 | 5/2008 | Cramer et al. |
| 2008/0133501 A1 | 6/2008 | Andersen et al. |
| 2008/0133504 A1 * | 6/2008 | Messer et al. ............... 707/5 |
| 2008/0162651 A1 | 7/2008 | Madnani |
| 2008/0162731 A1 | 7/2008 | Kauppinen et al. |
| 2008/0183596 A1 | 7/2008 | Nash et al. |
| 2008/0183681 A1 * | 7/2008 | Messer et al. ............... 707/3 |
| 2008/0183698 A1 * | 7/2008 | Messer et al. ............... 707/5 |
| 2008/0204595 A1 * | 8/2008 | Rathod et al. ............... 348/465 |
| 2008/0208839 A1 | 8/2008 | Sheshagiri et al. |
| 2008/0235209 A1 * | 9/2008 | Rathod et al. ............... 707/5 |
| 2008/0235393 A1 * | 9/2008 | Kunjithapatham et al. ... 709/236 |
| 2008/0242279 A1 | 10/2008 | Ramer et al. |
| 2008/0250010 A1 | 10/2008 | Rathod et al. |
| 2008/0266449 A1 | 10/2008 | Rathod et al. |
| 2008/0288641 A1 * | 11/2008 | Messer et al. ............... 709/226 |
| 2009/0029687 A1 | 1/2009 | Ramer et al. |
| 2009/0055393 A1 * | 2/2009 | Messer et al. ............... 707/5 |
| 2009/0077065 A1 | 3/2009 | Song et al. |
| 2009/0112848 A1 * | 4/2009 | Kunjithapatham et al. ....... 707/5 |
| 2010/0070895 A1 | 3/2010 | Messer |
| 2010/0191619 A1 | 7/2010 | Dicker et al. |

FOREIGN PATENT DOCUMENTS

| | | |
|---|---|---|
| CN | 1585947 | 2/2005 |
| CN | 1723458 A | 1/2006 |
| CN | 1808430 | 7/2006 |
| JP | 2003-099442 A | 4/2003 |
| KR | 10-2002-0005147 A | 1/2002 |
| KR | 10-2002-0006810 A | 1/2002 |
| KR | 10-2004-0052339 A | 6/2004 |
| KR | 10-2006-0027226 A | 3/2006 |
| WO | WO 01/37465 A2 | 5/2001 |
| WO | WO 02/43310 | 5/2002 |
| WO | WO 02/43310 A2 | 5/2002 |
| WO | WO 03/042866 | 5/2003 |
| WO | WO 2005/055196 A2 | 6/2005 |
| WO | WO 2007/004110 A2 | 1/2007 |

OTHER PUBLICATIONS

Apple Inc., Apple iTunes, http://www.apple.com/itunes/, Apr. 28, 2003.

Babaguchi, N. et al., "Intermodal collaboration: A strategy for semantic content analysis for broadcasted sports video," Sep. 2003, pp. 13-16.

Brill, E., "A simple rule-based part of speech tagger," Mar. 1992, Proceedings of the Third Conference on Applied Natural Language Processing, Trento, Italy.

Google Inc., Google Search Engine, http://www.google.com, Aug. 1998.

Google Inc., Google Desktop Search, http://desktop.google.com, Oct. 15, 2004.
Henzinger, M. et al, "Query-free news search," May 2003, Proceedings on the 12$^{th}$ International Conference on World Wide Web, Budapest, Hungary.
Livingston, K. et al., "Beyond broadcast: a demo," Jan. 2003, In Proceedings of the 8th international Conference on intelligent User interfaces, ACM Press, New York, NY, 325-325.
Microsoft Corporation, Microsoft Windows Media Player, http://www.microsoft.com/windows/windowsmedia/, Feb. 1999.
Microsoft Corporation, MSN TV, http://www.webtv.com/pc, Feb. 2006.
Opera Software ASA, Opera Browser for Devices, http://www.opera.com/products/devices/, Mar. 2006.
Rau Lisa, F. et al, "Domain-independent summarization of news," Jun. 1994, In Summarizing Text for Intelligent Communication, pp. 71-75, Dagstuhl, Germany.
Spalti, M., "Finding and Managing Web Content with Copernic 2000," Sep. 2000, Library Computing, Westport, pp. 217-221, vol. 18, No. 3.
Tjondronegoro, D. et al., "Extensible detection and indexing of highlight events in broadcasted sports video," Jan. 2006, Proceedings of the 29th Australasian Computer Science Conference, Hobart, Australia.
Wachman, J. et al., "Tools for Browsing a TV Situation Comedy Based on Content Specific Attributes," Mar. 2001, Multimedia Tools and Applications, v.13 n. 3, p. 255-284.
Yahoo Search Engine, http://search.yahoo.com, Dec. 1998.
Zhuang, Y. et al, "Applying semantic association to support content-based video retrieval," Oct. 1998, International workshop on Very Low Bitrate Video Coding (VLBV'98).
Notification of Transmittal of the International Search Report and the Written Opinion of the International Search Authority Application No. PCT/KR2008/000537 dated May 15, 2008, 16 pages.
U.S. Non-final Office Action for U.S. Appl. No. 11/732,887 mailed Jun. 5, 2009.
Ask Search Engine, http://www.ask.com, downloaded Sep. 19, 2008, p. 1, United States.
Copernic Inc., Copernic Desktop Search, http://www.copernic.com/en/products/desktopsearch/index.html, downloaded Sep. 19, 2008, p. 1, United States.
Google Inc., Google webhp, http://www.google.com/webhp?complete-1&hl-en, downloaded Sep. 25, 2008, p. 1, United States.
Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer—Verlag, Berlin, Heidelberg, Germany.
Moraveji, N. et al., "DynaLine: A Non-Disruptive TV User Interface for Passive Browsing of Internet Video," Microsoft Research Technical Report, 2006, pp. 1-4, United States.
Microsoft Corporation, Microsoft Windows Media Player 10, http://www.microsoft.com/windows/windowsmedia/mp10, downloaded Sep. 19, 2008, p. 1, United States.
Realnetworks. Inc., http://www.real.com, downloaded Sep. 19, 2008, p. 1, United States.
U.S. Final Office Action for U.S. Appl. No. 11/732,887 mailed on Dec. 4, 2009, United States.
U.S. Non-final Office Action for U.S. Appl. No. 11/981,019 mailed on Dec. 29, 2009, United States.
U.S. Final Office Action for U.S. Appl. No. 11/981,019 mailed on Jun. 17, 2010, United States.
Notification of Transmittal of the International Search Report and the Written Opinion of the International Searching Authority for International Application No. PCT/KR2008/001558, dated Jun. 26, 2008, 10 pages.
Chinese Office Action dated Aug. 14, 2009 issued in Chinese Patent Application No. 2008100826213 (English-language translation included).
Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.
U.S. Non-final Office Action for U.S. Appl. No. 12/056,184 mailed on Jun. 11, 2010.
U.S. Final Office Action for U.S. Appl. No. 12/056,184 mailed on Nov. 23, 2010.
U.S. Non-Final Office Action for U.S. Appl. No. 11/726,340 mailed May 19, 2009.
Livingston, K. et al., "Beyond Broadcast," 8th International Conference on Intelligent User Interfaces, Jan. 2003, pp. 260-262, Association for Computing Machinery, New York, NY.
Copernic Inc., http://copernic.com/en/products/desktop-search/index.html, Sep. 18, 2008.
U.S. Final Office Action for U.S. Appl. No. 11/969,778 mailed on Sep. 2, 2010.
U.S. Non-final Office Action for U.S. Appl. No. 11/969,778 mailed on Apr. 19, 2010.
Notification of Transmittal of the International Search Report and the Written Opinion of the International Searching Authority; International Search Report and Written Opinion of the International Searching Authority for Application No. PCT/KR2008/000537 dated May 15, 2008, 16 pages.
U.S. Non-final Office Action for U.S. Appl. No. 11/803,826 mailed on Jul. 24, 2009.
Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.
U.S. Final Office Action for U.S. Appl. No. 11/633,880 mailed Oct. 28, 2010.
U.S. Final Office Action for U.S. Appl. No. 11/713,350 mailed Sep. 9, 2010.
U.S. Non-final Office Action for U.S. Appl. No. 11/633,880 mailed May 11, 2010.
AOL LLC, http://www.aol.com, downloaded Sep. 19, 2008, pp. 1-2, United States.
U.S. Advisory Action for U.S. Appl. No. 11/633,880 mailed Nov. 25, 2009.
U.S. Non-final Office Action for U.S. Appl. No. 11/900,847 mailed Oct. 28, 2009.
"Placement in the DMOZ.org directory—Pure Power", DMOZ / Google Directory, posted on Apr. 30, 2005, p. 1, http://www.ahfx.net/weblog/13.
U.S. Office Action for U.S. Appl. No. 11/633,880 mailed Jan. 6, 2009.
U.S. Office Action for U.S. Appl. No. 11/633,880 mailed Aug. 10, 2009.
U.S. Final Office Action for U.S. Appl. No. 11/713,350 mailed Mar. 2, 2009.
U.S. Final Office Action for U.S. Appl. No. 11/713,350 mailed Aug. 14, 2009.
U.S. Non-final Office Action for U.S. Appl. No. 11/725,865 mailed Oct. 16, 2009.
U.S. Final Office Action for U.S. Appl. No. 11/725,865 mailed Mar. 16, 2010.
U.S. Non-final Office Action for U.S. Appl. No. 11/713,350 mailed Mar. 8, 2010.
U.S. Non-final Office Action for U.S. Appl. No. 11/808,826 mailed on Mar. 3, 2010.
U.S. Office Action for U.S. Appl. No. 11/726,340 mailed Oct. 14, 2010.
U.S. Office Action for U.S. Appl. No. 11/726,340 mailed Feb. 14, 2011.
U.S. Office Action for U.S. Appl. No. 11/726,340 mailed Dec. 9, 2009.
U.S. Office Action for U.S. Appl. No. 11/725,865 mailed Mar. 4, 2011.
U.S. Office Action for U.S. Appl. No. 11/633,880 mailed Mar. 17, 2011.
U.S. Office Action for U.S. Appl. No. 11/803,826 mailed Jun. 1, 2011.

U.S. Office Action for U.S. Appl. No. 11/969,778 mailed Jun. 15, 2011.
Office Action dated Jun. 27, 2011 from U.S. Appl. No. 11/725,865.
Final Office Action dated Mar. 16, 2011 from U.S. Appl. No. 11/981,019.
Office Action dated Aug. 2, 2011 from U.S. Appl. No. 11/713,312.
Office Action dated Mar. 25, 2010 from Chinese Patent Application No. 200810082621.3, 7pp., China (English-language translation included—15 pp).
Tivo Inc., http://www.tivo.com, downloaded Sep. 19, 2008, 1 page.
"Computing Meng Individual Project, ANSES—Automatic News Summarization and Extraction System,"http://mmis.doc.ic.ac.uk/pr-1.wong-2002/overview.html, downloaded Sep. 24, 2008, 4 pages.
Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.
Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.
Miura, K. et al., "Automatic Generation of a Multimedia Encyclopedia from TV Programs by Using Closed Captions and Detecting Principal Viedo Objects,"Proceedings of the Eigth IEEE International Sympsosium on Miltumedia (ISM ' 06), 2006, IEEE, 8 pages.

Office Action dated Aug. 19, 2011 from U.S. Appl. No. 11/821,938.
Office Action dated Aug. 22, 2011 from U.S. Appl. No. 11/981,019.
Final Office Action dated Sep. 1, 2011 from U.S. Appl. No. 12/263,089.
Office Action dated Sep. 8, 2011 from U.S. Appl. No. 12/544,994.
Final Office Action dated Sep. 21, 2011 from U.S. Appl. No. 11/633,880.
Final Office Action dated Sep. 27, 2011 from U.S. Appl. No. 11/969,778.
Notice of Allowance dated Nov. 1, 2011 from U.S. Appl. No. 11/281,938.
Chinese Office Action dated Dec. 14, 2010 from Chinese Application No. 20088003361.4.
Chinese Office Action dated Aug. 14, 2009 from Chinese Application No. 2008100826213.
Chinese Office Action dated Mar. 25, 2010 from Chinese Application No. 2008100826213.
Chinese Office Action dated Feb. 1, 2011 from Chinese Application No. 200710196237.1.
Office Action dated Dec. 15, 2011 from U.S. Appl. No. 12/263,089.
Ricci et al. "Acquiring and Revising Preferences in a Critique-Based Mobile Recommender System." Journal IEEE Intelligent Systems, vol. 22 Issue 3, May 2007.

* cited by examiner

METHOD AND SYSTEM FOR PROVIDING ACCESS TO INFORMATION OF POTENTIAL INTEREST TO A USER

FIELD OF THE INVENTION

The present invention relates to a method and a system for providing users access to information of interest.

BACKGROUND OF THE INVENTION

The number of networked devices in local area networks such as home networks is on the rise, and so is the amount of data stored on them. Typically, home network users store and access several types of content (such as audio, video, image and other data files) in different formats on/via their home devices. In addition to accessing these, home users also commonly access audio/video broadcast data streams via broadcast television or cable networks.

Further, the amount of information available on sources such as external networks, the Internet (e.g., the World Wide Web), etc. is continually on the rise. For example, it is very likely that a user can find useful information on the Internet related to at least some of the data stored on the devices in the user's home network. It is highly likely that the user can find large quantities of such related information in different formats (structured, semi-structured and unstructured) via multiple sources.

However, there is no system available that would allow a user to access such related information easily and seamlessly. The only way a user can achieve this is by manually performing a search for the desired information using an Internet search engine or by directly accessing a website (through a Web browser) that the user believes may contain such related information. Thus, the user is forced to comprehend and analyze large quantities of information to identify/access the exact information the user is looking for.

There are existing approaches in which a user can obtain information in a network of resources. In one approach, the user requests the information. The user specifies information using keywords and then browses the information to find the piece of information that satisfies the user's needs. However, specifying keywords using devices without keyboards, such as consumer electronics (CEs) devices, can be a tedious task.

Another approach involves a configuration that uses a TV and a PC. The PC analyzes the subtitles of the TV program and categorizes the program as general, news, medical, etc. The hierarchy of categories is fixed and built from questions posed to broadcast TV viewers. Content of a particular program is mapped to a fixed number of categories. The user can view additional information only when the content matches one of the specified categories. Queries are linked to fixed sources, limiting the amount of information that can be retried for the user. Further, the PC is required and the system cannot function when the PC is turned off. There is, therefore, a need for a method and a system for analyzing and obtaining information of interest to the user, without limiting specific sources of information.

BRIEF SUMMARY OF THE INVENTION

The present invention provides a method and system for providing access to information of potential interest to a user. In one embodiment, this involves analyzing closed-caption information and obtaining information of interest to a user, without limiting specific sources of information. Such an approach is useful in providing access to information of potential interest to a user of an electronic device, by monitoring the user interaction with the device to identify information accessed by the user, determining key information based on the identified information, wherein the identified information includes closed-caption information, and searching available sources for information of potential interest to the user based on said key information. Searching available sources includes forming a query based on the key information, and searching an external network such as the Internet using the query.

One example of such an electronic device is a CE device such as a TV that receives TV programming including closed-caption information. The closed-caption information of a TV program being accessed/viewed by a user is analyzed and key information extracted. This involves converting the closed-caption information to text, removing stop words, and ranking the remaining words based on their frequency of occurrence, proper noun information, and/or other criteria. The ranked words represent key information such as keywords/phrases that are used to form queries and conduct searches using search engines such as available Internet search engines. The search results are presented to the user as recommendations, representing information of potential interest to the user. The user can select among the recommendations for further searching to find additional and/or more refined information of interest to the user.

These and other features, aspects and advantages of the present invention will become understood with reference to the following description, appended claims and accompanying figures.

DETAILED DESCRIPTION OF THE INVENTION

Figure 1:
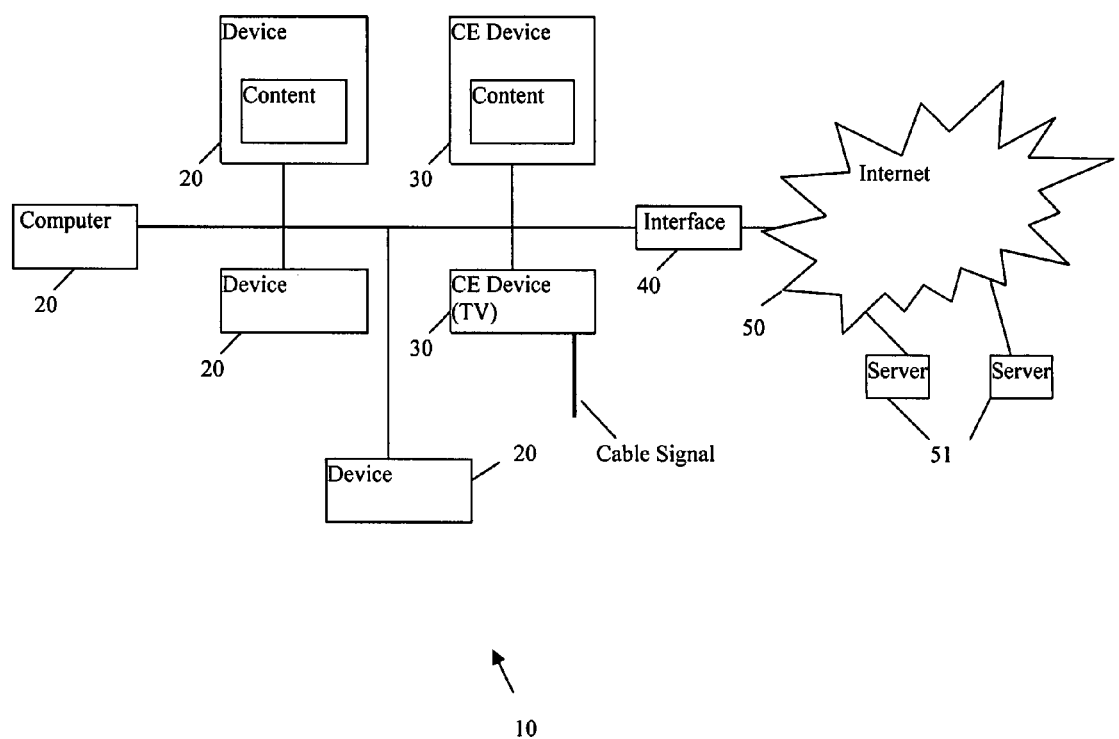
FIG. 1 shows an example of a network of electronic devices that implements an embodiment of the present invention.

The present invention provides a method and a system for analyzing and obtaining information of interest to a user, without limiting specific sources of information. Potential information that the user may be interested in is determined by monitoring the user's interactions with a device in a local network of devices, connected to an external network. Such a device can be a CE device in a local area network (e.g., a home network) that is connected to the Internet.

In one implementation, this involves receiving close-captioned programming including closed-caption (CC) information, and analyzing the closed-caption information for key information indicating user interests. The key information is then used to find related information from sources of information such as the Internet, which the user may potentially be interested in.

On a typical CE device such as a TV, in the absence of a keyboard, it is difficult for a user to search for information on the Internet by entering keywords. If a user is watching a TV program, that is a good indication that the user is interested in the content of the TV program. Therefore, the content of the TV program is analyzed by gathering and analyzing text received as CC information for the TV program. Further, contextual information is gathered from the information about the channel being watched. The CC information and the contextual information can be combined and used to make recommendations to the user about information the user may potentially be interested in.

The gathered information is used to determine one or more keywords of potential interest to the user. The keywords are then used to search for related information on the Internet. For example, if the user is watching a news coverage involving Baltimore, the word "Baltimore" is extracted as a keyword. That keyword is used to form a query to search the Internet by using a search engine to find information, such as websites that include information about Baltimore city or Baltimore Ravens, etc.

The search results are presented to the user as recommendations, comprising potential search queries which may be selected by the user and executed to find further information on the Internet that may be of interest to the user. For example, while the user is watching a documentary on Antarctica on a TV, the keyword Antarctica is selected as a keyword and a search on the Internet returns "polar bears" as a recommendation of potential interest to the user. The user can then choose that recommendation to find more information about polar bears. If so, a query for "polar bears" is sent to a search engine and the results are displayed for the user.

Searching is not limited to a predetermined or fixed number of categories or queries or information sources. In one example, keywords are identified based on the CC information for searching. The keywords may be suggested to the user, wherein upon user selection, additional information is obtained using search engines that search available sources on the Internet (different websites available to the search engines), rather than a predetermined and/or a fixed number of sources such as one or more particular websites.

FIG. 1 shows a functional architecture of an example network 10, such as a local network (e.g., a home network), according to an embodiment of the present invention. The network 10 embodies a process for analyzing TV CC information to find related information on the Internet 50. The network 10 comprises electronic devices 20 which may include content, and CE devices 30 (e.g., TV, DVD player, cell phone, PDA, etc.) which may include content. The network 10 further includes an interface 40 that connects the network 10 to an external network 50 (e.g., another local network, the Internet, etc.). The external network 50 is connected to one or more servers 51. Though the devices 20 and 30 are shown separately, a single physical device can include one or more logical devices. As described further below, in one example, a process for analyzing TV CC information and suggesting information of interest to the user, according to the present invention can be implemented in a device 30 in FIG. 1.

The devices 20 and 30, respectively, can implement the UPnP protocol for communication therebetween. Those skilled in the art will recognize that the present invention is useful with other network communication protocols (e.g., Jini, HAVi, IEEE 1394, etc.). Further, the network 10 can be a wired network, a wireless network, or a combination thereof.

A system that implements a process for analyzing TV CC information receives a TV signal as input. The channel being viewed by the user is monitored and corresponding CC information that is a part of the TV signal is analyzed. Then, a set of keywords are determined which capture the gist of what is being viewed by the user.

Figure 2:
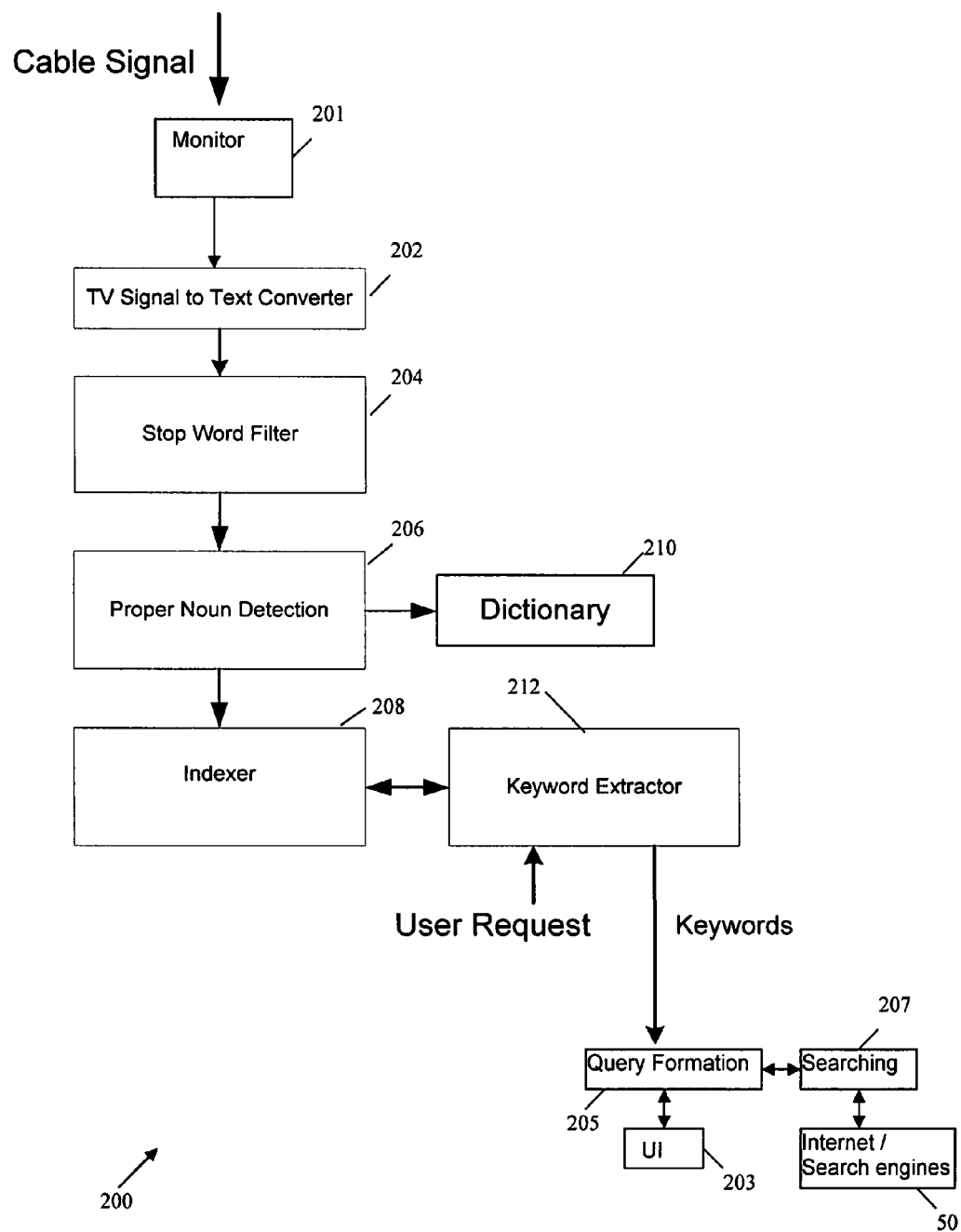
FIG. 2 shows a functional block diagram of an example system for analyzing TV closed-caption information to find related information on the Internet, according to an embodiment of the present invention.

FIG. 2 shows a functional block diagram of an example system 200 for analyzing TV CC information according to an embodiment of the present invention. The system 200 utilizes a channel monitor 201, a TV Signal to Text Converter 202, a Stop Word Filter 204, a Proper Noun Detector 206, an Indexer 208, a Dictionary 210 and a Keyword Extractor 212.

Figure 3A:
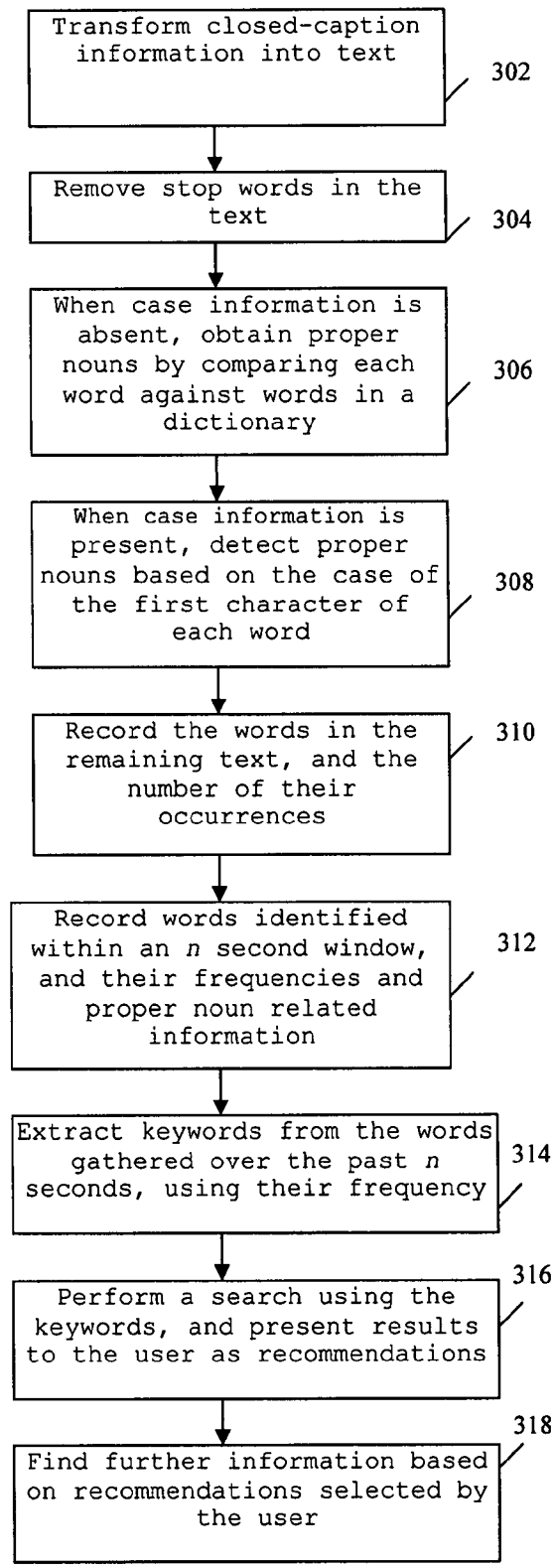
FIG. 3A shows a flowchart of example steps of a process for analyzing TV closed-caption information to find related information on the Internet, according to an embodiment of the present invention.

The monitor 201 monitors the TV/cable signal and determines channel information that is accessed/viewed by the user. That information includes CC information which is analyzed to extract words that capture the context, by utilizing the example process 300 in FIG. 3A. The example process 300 includes the steps of:

Step 302: The CC information transformed into text by the converter 202 using known transformation methods.

Step 304: The stop words in the text are removed by the Stop Word Filter 204. Stop words include words such as "of", "on", "the" etc., which have no meaning by themselves.

Step 306: Using the Proper Noun Detector 206, when case information is absent, proper nouns are detected (identified) by comparing each word in the remaining text against the Dictionary 210. Typically, proper nouns start with uppercase letters. On other occasions, the text obtained is case insensitive. The Dictionary 210 includes words that are not proper nouns. If the word under consideration is not present in the Dictionary 210, then it is assumed to be a proper noun. Proper nouns convey useful contextual information as they refer to specific names of people, places or things. Words identified as proper nouns are therefore tagged by the Proper Noun Detector 206 for ranking later.

Step 308: Using the Proper Noun Detector 206, when case information is present, proper nouns are detected based on the case of the first character of each word. Proper nouns are tagged by the Proper Noun Detector 206 for ranking later.

Step 310: The remaining words, and the number of their occurrences (frequency), is recorded by the Indexer 208. More frequent words are important words, from which keywords will be selected. The record of words are reset as soon as the channel is changed or a topic change is discovered using special characters in the text obtained from the CC information.

Step 312: The Indexer 208 maintains words identified within an n second window (i.e., words received within an n second period of time, which may be the last n seconds) and their frequencies and proper noun related information. For example, an n=10 second window includes the words gathered in the past 10 seconds. The keywords indexed in step 310 cover the entire current TV program/story, etc., being watched, while the keywords discussed in this step, cover those gathered in the last 'n' seconds.

Step 314: The frequency of all words is used by the Keyword Extractor 212 to extract words (i.e., keywords) of interest from all words gathered from the past n seconds.

Step 316: The keywords are used for forming queries in a Query Formation module 205 for performing searches on available resources such as search engines on the Internet 50 by a Searching module 207. A User Interface (UI) module 203 presents the search results to the user as recommendations for optional further selection.

Step 318: The user selects among the recommendations, wherein the selected recommendation are used by the Searching module 207 for searching the available resources for additional information of interest to the user. Such additional information is presented to the user by the UI module 203.

Steps 316 and 318 allow the user to find more information about a program that the user recently viewed on the TV, and can be repeated as the user desires to provide the user with additional and/or further refined information of interest to the user.

Figure 3B:
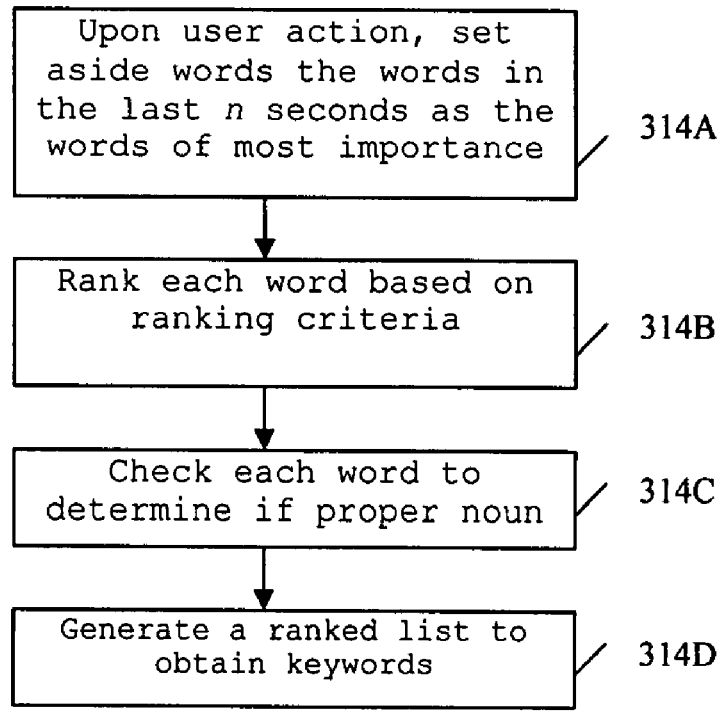
FIG. 3B shows a flowchart of example steps of keyword extraction in the process of FIG. 3A.

FIG. 3B shows an example flowchart of the steps performed by the extractor 212, including:

Step 314A: When the user activates a specific button on the TV control (e.g., a TV remote control), this provides a User Request that includes the user action. Upon a User Request, the words in the last n seconds are set aside as the words of most importance by the Keyword Extractor 212.

Step 314B: Further, each word is ranked based on its frequency or another ranking mechanism.

Step 314C: Each word is also checked for proper noun status, using the tag generated in steps 308 or 310.

Step 314D: A ranked list is produced wherein, in one example, high frequency words that are also proper nouns occupy the top of the list. Then follow the high frequency words and then words that are proper nouns. The top i words from the ranked list along with the high frequency words and the proper nouns identified since the start of the TV program, capture the context of what the user is watching. The information from the ranked list is used as keywords. Words captured in the n second window represent the context at a finer level of detail, whereas the proper nouns and high frequency words captured since the start of the program represent the context at a higher level.

Using Electronic Program Guide (EPG) information, which includes information about TV programs on cable TV, satellite TV, etc., the name of the channel being viewed, is used to frame the queries in steps 316, 318, along with the channel and program information. For example, when the user is viewing the "Panorama" program on BBC America, the words "Panorama" and "BBC America" are appended to the extracted keywords to provide related information in the context of the channel and program for searching.

Further, the extracted keywords can be converted into different languages and used for searching to find additional information on the Internet 50. Further, converting keywords, as opposed to sentences, from one language to the other is simple and can be done using a language-to-language dictionary. This is beneficial to users who may understand only a minor portion of the language in the TV program being watched.

Figure 4:
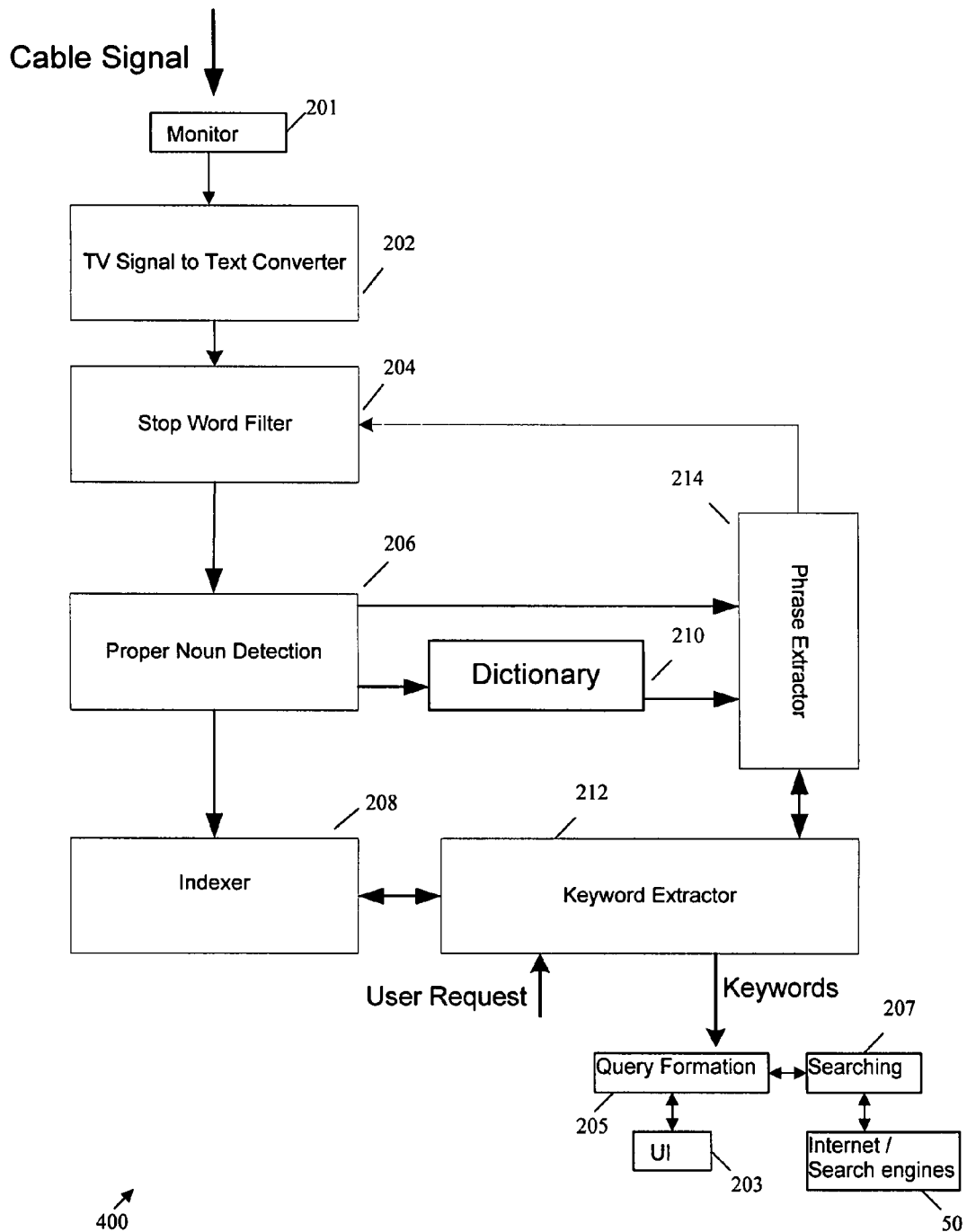
FIG. 4 shows a functional block diagram of another example system for analyzing TV closed-caption information to find related information on the Internet, according to another embodiment of the present invention.

FIG. 4 shows a functional block diagram of another example of a system 400 for analyzing TV CC information to find related information on the Internet, according to the present invention. The system 400 is a variation of system 200 in FIG. 2, and further includes a Phrase Extractor 214 to identify phrases, in addition to keywords. An example of a phrase can be "Baltimore Ravens" instead of the keywords "Baltimore" and "Ravens."

In this embodiment, the Keyword Extractor 212 not only relies on information from the Proper Noun Detector 206 and the Indexer 208, but also uses information from the Phrase Extractor 214 to obtain keywords. The Phrase Extractor 214 includes a phrase identifier function that identifies important phrases using frequency and co-occurrence information recorded by the Indexer 208, along with a set of rules. This is important in identifying multi-word phrases such as "United Nations", "Al Qaeda", etc.

In operation, the gathered CC text is first passed through the phrase identifier to capture phrases, and then the captured phrases are indexed. The phrase identifier internally maintains three lists: a list of proper nouns, a dictionary, and a list of stop words. The phrase identifier uses an N-gram based approach to phrase extraction, in which conceptually, to capture a phrase of length 'N' words, a window of size 'N' words is slid across the text and all possible phrases (of length 'N' words) are collected. Then they are passed through the following set of three rules to filter out meaningless phrases:

1. A word ending with punctuation cannot be in the middle of a phrase.
2. For a phrase length of two words or more, the first word cannot be a stop word other than the two articles: 'the' (definite) and 'a/an' (indefinite) and the rest of the words cannot be stop words other than conjunctive stop words like 'the', 'on', 'at', 'of', 'in', 'by', 'for', 'and' etc. This is because the above mentioned stop words are often used to combine two or more words: e.g., "war on terror", "wizard of oz", "the beauty and the beast", etc.
3. Proper nouns and words not present in the dictionary are treated as meaningful phrases.

The Phrase Extractor 214 includes a term extractor function which extracts the highest score terms and phrases from the index. The terms and phrases are presented to the user and can be used for further searching to provide additional information of interest to the user.

Alternatively, the Phrase Extractor 214 includes a natural language processing (NLP) tagger and a set of extraction rules to extract important phrases. In operation, the NLP tagger tags each word in the closed caption text with its part-of-speech (i.e. whether the word is a 'noun', 'adjective', 'proper noun' etc.) The extraction rules define the kinds of sequences of such tags that are important. For example, a rule can be to extract phrases which are "a sequence of more than one 'proper nouns'" and another rule can be to extract "a sequence of one or more 'adjectives' followed by one or more 'nouns'." The Phrase Extractor applies these rules to the text tagged by the part-of-speech tagger and extracts phrases that follow these sequences. It can also be used to extract single word keywords by using appropriate rules.

In one example, in FIGS. 2 and/or 4, all the elements except the Internet/Search Engine 50, reside on a CE device (e.g. CE device 30). In another example, in FIGS. 2 and/or 4, the Internet/Search Engine 50 resides on the Internet, the Dictionary 210 resides on the network (local or Internet), while the other elements reside on the CE device.

Although, in the examples provided herein, a TV is used to receive closed-caption information, the present invention can be applied to other devices (e.g., music player, etc.) that receive information that can be used for analysis to determine and search for information of interest to the user, according to the present invention.

Further, although in FIG. 1 a CE device 30 which is used to receive programming in including CC information, is shown connected to a home network, such a home network is not required and the CE device can be a stand-alone device that receives programming from cable, satellite, DSL, or other sources of programming, without connection to a home network. Such a stand-alone device need only be connected to sources of information such as connected to the Internet 50, without the need for a home/local network. Further, the present invention can be implemented in non-CE devices (e.g., a device 20 in FIG. 1) that may be a stand-alone device or connected to a home/local network. Further, although in the examples herein closed-caption information is used for analysis and determination of user interests, in another implementation the present invention is useful with other types of information that represent the type of programming or content being accessed/viewed by a user.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of providing access to information of potential interest to a user of an electronic device, comprising the steps of:
   while content is being displayed on the device, periodically updating a first word buffer with words extracted from closed captioning information corresponding to the content since a beginning of a program or story, and periodically updating a second word buffer with words extracted from closed captioning information corresponding to the content based on a most recent n seconds, wherein n is a preset value, such that the second word buffer maintains keywords only present in the closed captioning information during the last n seconds of time;
   monitoring the user interaction with the device to identify when the user provides user input indicating an interest in learning more information about content currently being displayed on the electronic device;
   wherein said device comprises a TV;
   wherein said monitoring further includes monitoring user interaction with the TV;
   extracting keywords from the second word buffer based on frequency of appearances of words in the first word buffer by analyzing the closed-caption information provided to the user via the TV currently stored in the first and the second word buffers;
   converting the extracted keywords into a foreign language;
   determining key information, includes supplementing the extracted keywords with keywords related to contextual information about the content of a channel being watched, based on the extracted keywords when the user input indicating the interest is identified; and
   searching available sources for information of potential interest to the user based on said key information.

2. The method of claim 1 further comprising the step of providing information of potential interest to the user based on the searching.

3. The method of claim 1 wherein searching available sources further includes forming a query based on the key information, and searching an external network using the query.

4. The method of claim 1 wherein the first word buffer is reset when the content changes to a different program or story.

5. The method of claim 4 wherein the step of monitoring further includes monitoring which content the user chooses to access via the device.

6. The method of claim 5 wherein the step of monitoring further includes monitoring the closed-caption information provided via the channel the user chooses to access via the device.

7. The method of claim 1 wherein the step of extracting keywords further includes:
   converting the closed-caption information into text; and
   analyzing the text to determine keywords and/or key phrases of interest to the user.

8. The method of claim 1 wherein the step of extracting keywords further includes the steps of:
   converting the closed-caption information into text;
   removing stop words in the text; and
   selecting remaining information in the text as key information, based on the number of occurrences of such remaining information.

9. The method of claim 1 wherein the step of extracting keywords further includes:
   converting the closed-caption information into text;
   removing stop words in the text;
   for each remaining word, when case information is absent, detecting a proper noun by comparing the word against a dictionary, otherwise detecting a proper noun based on the case of the first character of each word;
   determining and indexing frequency of occurrences of the words remaining; and
   extracting words of interest to the user based on frequency and related proper noun detection.

10. The method of claim 9 wherein the step of extracting words of interest further includes:
    ranking a set of remaining words based on certain ranking criteria;
    checking a set of the remaining words for proper nouns; and
    generating a ranked list from the ranked words and proper nouns as keywords, wherein high ranking words and proper nouns are of higher priority.

11. The method of claim 1 further comprising the steps of:
    providing the search results to the user as information of potential interest to the user;
    receiving user selection from the information of potential interest to the user; and
    performing further searching of available sources for additional information of potential interest to the user based on the user selected information.

12. The method of claim 1 wherein:
    the device is connected to a local area network; and
    searching available sources further includes forming a query based on the key information, and searching the Internet using the query.

13. A system for providing access to information of potential interest to a user of a device, comprising:
    a processor;
    a memory;
    an indexer that is configured to while content is being displayed on the device, periodically update a first word buffer in the memory with words extracted from closed captioning information corresponding to the content since a beginning of a program or story and periodically updating a second word buffer in the memory with words extracted from closed captioning information corresponding to the content based on a most recent n seconds, wherein n is a preset value such that the second word buffer maintains keywords only present in the closed captioning information during the last n seconds of time;

a monitor that is configured to monitor user interaction with the device;
wherein said device comprises a TV;
wherein said monitor further configured to monitor user interaction with the TV;
an analyzer that is configured to extract keywords from the second word buffer based on frequency of appearances of words in the first word buffer by analyzing the closed-caption information provided to the user via the TV currently stored in the first and the second word buffers and to determine key information, includes supplementing the extracted keywords with keywords related to contextual information about the content of a channel being watched, based on the extracted keywords when the user input indicating the interest is identified;
a converter configured to converting the extracted keywords into a foreign language; and
a searcher configured to search for information of potential interest to the user based on said key information.

14. The system of claim 13 wherein the searcher is further configured to cause searching of available sources for information of potential interest to the user based on said key information.

15. The system of claim 14 further comprising a display configured to display the search results to the user as information of potential interest to the user.

16. The system of claim 15 wherein:
said searcher is further configured to provide the search results to the user as information of potential interest to the user and receive user selection from the information of potential interest to the user; and
the analyzer is configured to cause further searching of available sources for additional information of potential interest to the user based on the user selected information.

17. The system of claim 14 wherein the analyzer is further configured to form a query based on the key information, and to cause searching of an external network using the query.

18. The system of claim 14 wherein the monitor is further configured to monitor which information the user chooses to receive on the TV.

19. The system of claim 18 wherein the monitor is further configured to monitor which channels the user chooses to view on the TV.

20. The system of claim 19 wherein the monitor is further configured to monitor the closed-caption information provided via the channel the user chooses to view on the TV.

21. The system of claim 20 wherein the analyzer comprises:
the converter that is configured to convert the closed-caption information into text; and
an extractor that is configured to analyze the text to determine keywords and/or key phrases of potential interest to the user.

22. The system of claim 20 wherein the analyzer comprises:
the converter that is configured to convert the closed-caption information into text;
a stop word filter that is configured to remove stop words in the text; and
an extractor that is configured to determine words of interest to the user as keywords.

23. The system of claim 20 wherein the analyzer comprises:
the converter that is configured to convert the closed-caption information into text;
a stop word filter that is configured to remove stop words in the text;
the indexer that is configured to determine frequency of occurrence of the remaining words; and
an extractor that is configured to determine words of interest to the user as keywords based on frequency of occurrence.

24. The system of claim 23 wherein the extractor is further configured to rank a set of remaining words based on certain ranking criteria, to generate a ranked list from the ranked words and proper nouns, and to generate keywords from the ranked list.

25. The system of claim 20 wherein the analyzer comprises:
the converter that is configured to convert the closed-caption information into text;
a stop word filter that is configured to remove stop words in the text;
the indexer that is configured to determine frequency of occurrence of the remaining words;
a proper noun detector that is configured such that for each remaining word, when case information is absent, the proper noun detector detects a proper noun by comparing the word against a dictionary, otherwise detects a proper noun based on the case of the first character of the word; and
an extractor that is configured to determine words of interest to the user as keywords based on frequency of occurrence and related proper noun detection.

26. The system of claim 13 wherein:
the electronic device is configured for connection to a local area network; and
the analyzer is further configured to form a query based on the key information, and causing searching of the Internet using the query.

27. An electronic device comprising:
a processor;
a memory;
a controller that is configured to provide access to information of potential interest to the user of the device, the controller including:
an indexer that is configured to, while content is being displayed on the device ~ periodically update a first word buffer in the memory with words extracted from closed captioning information corresponding to the content since a beginning of a program or story, and periodically updating a second word buffer in the memory with words extracted from closed captioning information corresponding to the content based on a most recent n seconds, wherein n is a preset value, such that the second word buffer maintains keywords only present in the closed captioning information during the last n seconds of time;
wherein said device comprises a TV;
wherein said monitor further configured to monitor user interaction with the TV;
a monitor that is configured to monitor user interaction with the device;
an analyzer that is configured to extract keywords from the second word buffer based on frequency of appearances of words in the first word buffer by analyzing the closed-caption information provided to the user via the TV currently stored in the first and the second word buffers and to determine key information, includes supplementing the extracted keywords with keywords related to contextual information about the content of a channel being watched, based on the extracted keywords when the user input indicating the interest is identified; and a converter configured to convert the extracted keywords into a foreign language.

28. The device of claim 27 wherein the analyzer is further configured to cause searching of available sources for information of potential interest to the user based on said key information.

29. The device of claim 28 further comprising a display configured to display the search results to the user as information of potential interest to the user.

30. The device of claim 28 wherein the analyzer is further configured to form a query based on the key information, and to cause searching of an external network using the query.

31. The device of claim 28 wherein the monitor is further configured to monitor which information the user chooses to receive on the device.

32. The device of claim 31 wherein the monitor is further configured to monitor which channels the user chooses to receive on the device.

33. The device of claim 32 wherein the monitor is further configured to monitor the closed-caption information provided via the channel the user chooses to access via the device.

34. The device of claim 33 wherein the analyzer comprises:
the converter that is configured to convert the closed-caption information into text; and
an extractor that is configured to analyze the text to determine keywords and/or key phrases of potential interest to the user.

35. The device of claim 33 wherein the analyzer comprises:
the converter that is configured to convert the closed-caption information into text;
a stop word filter that is configured to remove stop words in the text; and
an extractor that is configured to determine words of interest to the user as keywords.

36. The device of claim 35 wherein the extractor is further configured to rank a set of remaining words based on certain ranking criteria, to generate a ranked list from the ranked words and proper nouns, and to generate keywords from the ranked list.

37. The device of claim 33 wherein the analyzer comprises:
the converter that is configured to convert the closed-caption information into text;
a stop word filter that is configured to remove stop words in the text;
the indexer that is configured to determine frequency of occurrence of the remaining words; and
an extractor that is configured to determine words of interest to the user as keywords based on frequency of occurrence.

38. The device of claim 33 wherein the analyzer comprises:
the converter that is configured to convert the closed-caption information into text;
a stop word filter that is configured to remove stop words in the text;
the indexer that is configured to determine frequency of occurrence of the remaining words;
a proper noun detector that is configured such that for each remaining word, when case information is absent, the proper noun detector detects a proper noun by comparing the word against a dictionary, otherwise detects a proper noun based on the case of the first character of the word; and
an extractor that is configured to determine words of interest to the user as keywords based on frequency of occurrence and related proper noun detection.

* * * * *